United States Patent
Sayers et al.

(10) Patent No.: US 11,198,248 B2
(45) Date of Patent: Dec. 14, 2021

(54) 3D PRINT PART PLACEMENT

(71) Applicant: Hewlett-Packard Development Company, L.P., Spring, TX (US)

(72) Inventors: Craig Peter Sayers, Palo Alto, CA (US); Jordi Morillo Peres, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/617,004

(22) PCT Filed: Jan. 19, 2018

(86) PCT No.: PCT/US2018/014463
§ 371 (c)(1),
(2) Date: Nov. 26, 2019

(87) PCT Pub. No.: WO2019/143352
PCT Pub. Date: Jul. 25, 2019

(65) Prior Publication Data
US 2021/0122109 A1 Apr. 29, 2021

(51) Int. Cl.
*B33Y 50/00* (2015.01)
*B29C 64/182* (2017.01)
*B29C 64/386* (2017.01)
*B33Y 10/00* (2015.01)

(52) U.S. Cl.
CPC .......... *B29C 64/182* (2017.08); *B29C 64/386* (2017.08); *B33Y 10/00* (2014.12); *B33Y 50/00* (2014.12)

(58) Field of Classification Search
CPC ........................................................ B33Y 50/00
USPC ......................................................... 700/118
See application file for complete search history.

(56) References Cited

U.S. PATENT DOCUMENTS

| 7,366,643 | B2  | 4/2008  | Verdura et al. |
| 8,032,391 | B2  | 10/2011 | Erie et al. |
| 9,248,611 | B2  | 2/2016  | Divine et al. |
| 10,289,755 | B2* | 5/2019 | Sugiura ................. G06F 30/00 |
| 2015/0057784 | A1 | 2/2015 | Butler et al. |
| 2016/0221262 | A1* | 8/2016 | Das ..................... B29C 35/0805 |

(Continued)

FOREIGN PATENT DOCUMENTS

WO  WO-2015022572 A3  8/2015
WO  WO-2017023284 A1  2/2017

OTHER PUBLICATIONS

Burke, Edmund K et al. "Automating the Packing Heuristic Design Process with Genetic Programming," Evolutionary Computation 20, No. 1 (2012): 63-89.

(Continued)

*Primary Examiner* — Suresh Suryawanshi
(74) *Attorney, Agent, or Firm* — Tong Rea Bentley & Kim LLC (57) ABSTRACT

Examples disclosed herein relate to determining 3D print part placement. In one implementation, a processor generates a user interface to receive user input related to multiple divisions of 3D print parts and a relative ordering between the divisions. The processor may determine part placement information for the parts in the divisions in a 3D print build area based on user input to the user interface. The processor may translate the determined part placement information into 3D printer instructions.

15 Claims, 10 Drawing Sheets

(56) References Cited

U.S. PATENT DOCUMENTS

2017/0173889 A1\* 6/2017 Thomas-Lepore .... B33Y 50/00
2018/0300433 A1\* 10/2018 Maxam ................... G06F 30/13
2020/0238608 A1\* 7/2020 Barnes ................. B29C 64/205
2020/0398495 A1\* 12/2020 Roca ....................... G06T 19/00
2021/0039320 A1\* 2/2021 Tucker ................. B29C 64/386

OTHER PUBLICATIONS

Falkenauer, Emanuel. "A Hybrid Grouping Genetic Algorithm for Bin Packing." Journal of Heuristics 2, No. 1 (1996): 5-30.

\* cited by examiner

3D PRINT PART PLACEMENT

BACKGROUND

A 3D printer may be used to manufacture an object using a layer-wise method. For example, an energy source may be used to fuse a build material in a layer by layer method. The build material may be fused such that multiple parts are created in 3D printer build area.

BRIEF DESCRIPTION OF THE DRAWINGS

The drawings describe example embodiments. The following detailed description references the drawings, wherein.

DETAILED DESCRIPTION

Part packing for 3D printing may involve determining how to arrange parts to be created on a 3D printer build area. In one implementation, a computing system creates a user interface to facilitate arranging the parts in the build area. For example, a computing system may access information related to a first set of 3D print parts to be printed and a relative order of the first set compared to a second set of 3D print parts to be printed. The computing system may determine position information in a 3D printer build area for the first and second set of parts. For example, the first set of parts may be automatically positioned in a manner based on a print metric, and the second set of parts may be automatically positioned in remaining space after the positioning of the first set of parts based on the at print metric. The computing system may translate the position information into 3D printer instructions. For example, a 3D printer may print the parts according to the selected placement. The build material, agents, and/or other materials may be utilized in a manner to create the parts according to the selected part placement.

The packing configuration of parts in a 3D printer build area may affect 3D print metrics, such as print time. For example, parts packed in fewer layers may be printed more quickly than if the same set of parts are packed differently to include more printing layers. As another example, in a print job limited to a portion of a 3D printer build area, a printer carriage may not move completely across the print area, making the print time faster.

Combining user control with incremental deterministic automatic part packing may allow a user to be involved in prioritizing parameters. For example, a user may make selections on which parts to prioritize and view print time and other print metrics without making decisions on complete print build area placement. The method may allow a user to have some transparency into the packing process without completing the entire packing solution manually. For example, a 3D print job may be reduced to a set of divisions for a user to manage such that the user does not work individually with each of the parts within a division for packing.

Figure 1:
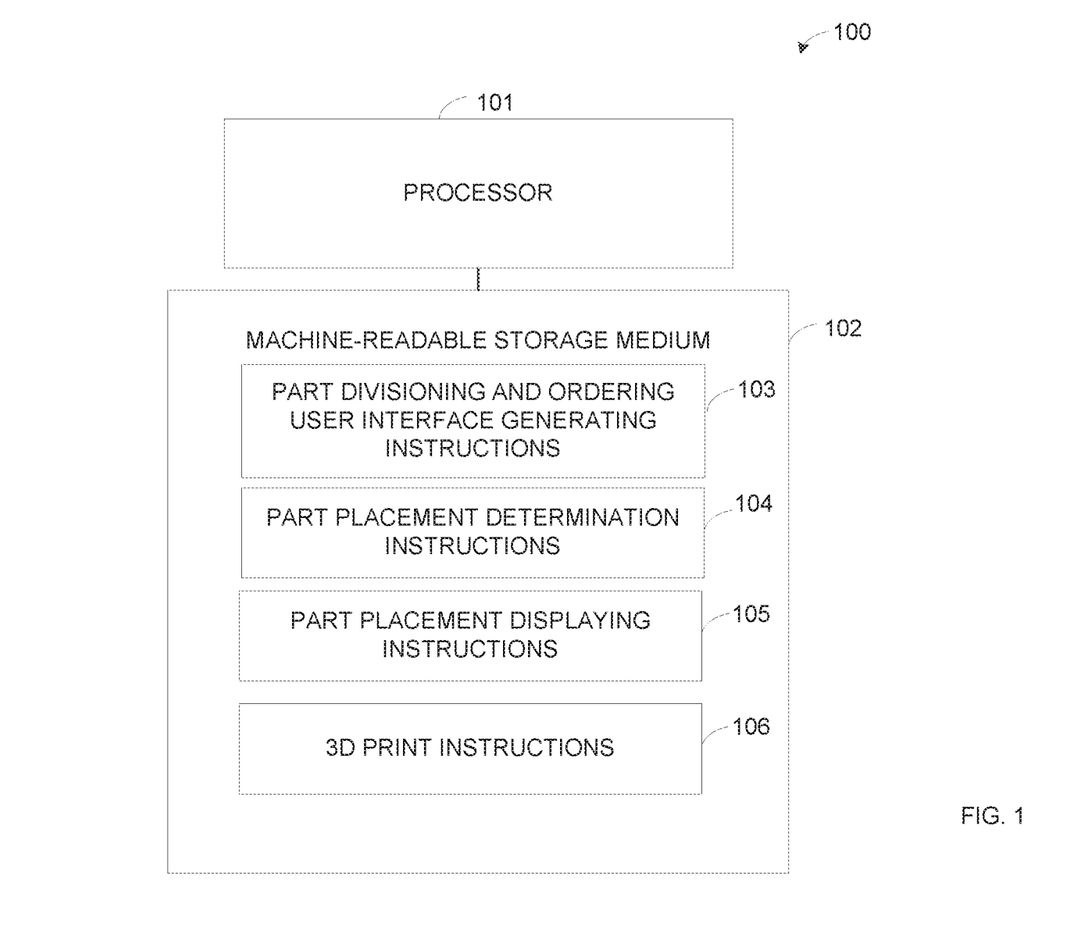
FIG. 1 is a block diagram illustrating one example of a computing system to determine 3D print part placement.

FIG. 1 is a block diagram illustrating one example of a computing system to determine 3D print part placement. For example, the computing system 100 may determine how to place a set of parts to be printed in a 3D printer build area. The build area may be, for example, a build bed, such as a powder bed, a build plate, or other mechanism for creating a 3D printed part. The build area may be associated with any suitable 3D printing technology, such as Selective Laser Sintering or Multi-jet Fusion. The part placement information may be used to create instructions for the 3D printer to print the set of parts. The computing system 100 may include a processor 101 and a machine-readable storage medium 102. The computing system 100 may include a 3D printer for printing the parts according to the determine placement information.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 includes part divisioning and ordering user interface generating instructions 103, part placement determination instructions 104, part placement displaying instructions 105 and 3D print instructions 106.

The part divisioning and ordering user interface generating instructions 103 may include instructions to receive user input related to a divisioning of parts to be 3D printed. For example, the computing system 100 may generate a user interface to be displayed to receive user input related to divisioning of parts to be 3D printed. The generated user interface may be any suitable user interface to allow typed, touch, verbal, or other input related to 3D print parts for a print job. In one implementation, the user input may be received from a storage. In one implementation, a user interface is generated to receive user input that is stored for later use for determining part placement in a 3D printer build area.

The user input may include information about multiple divisions of 3D printed parts. For example, a user interface may allow a user to select a part type and a number of parts for each division added to a 3D print job. The same part type may be included in multiple divisions such that the different divisions of the same part type may be given different priority orders in the build area placement. As an example, the computing system 100 may receive user input for a 3D printed first part type and a number of parts of the first part type to form a first division, user input for a 3D printed second part type and a number of parts of the second part type to form a second division, and user input for the 3D printed first part type and a number of parts of the first part type to form a third division.

The computing system 100 may generate a user interface to receive user input related to a relative priority order between the divisions. The order may be used to place the parts in the build area such that a division with a higher priority order is placed in the build area prior to a division of parts with a lower priority order.

The part placement determination instructions 104 may include instructions to automatically determine part placement information for the parts in a 3D print area based on the ordering between the divisions such that the parts in a division with a higher priority order are placed prior to the parts in a division with a lower priority order. For example, the parts in a highest priority division may be placed in optimal positions within the print area and parts in a second highest priority division may be placed in optimal positions in the remaining available portions of the print area. An optimal area may be determined based on a resulting print metric or set of print metrics from a potential part placement. An additional division of parts may added and prioritized after the existing divisions such that the placement of the additional division does not affect the placement of the parts in the divisions of higher priority already placed in the build area.

In one implementation, the computing system 100 includes a storage to store information about print process information, such as printer settings, such that the part placement information may be determined based on the print process information. The print process information may be, for example, related to build area size, build material, or other settings affecting the 3D printing process. For example, the parts may be placed with more spacing between parts depending on the material type, or the parts may be placed differently based on the dimensions of the 3D printer build area.

The part placement displaying instructions 105 may include instructions to display information related to the determined placement information and a print metric associated with the determined placement information. The print metric may be any suitable metric such as print time, material amount, or energy usage. The placement information may be displayed in any suitable manner, such as where parts are placed in a relative position in a print build area. In one implementation, the print area is shown with a grid or other marker to provide information about the relative size of the print area to the parts.

The 3D printer instructions 106 may include instructions to translate the determined part placement information into 3D printer instructions. For example, the part placement information may affect build material, energy source, and/or agent distribution. In one implementation, the computing system 100 includes a 3D printer to print the divisions of parts according to the determined placement. In one implementation, the computing system 100 transmits the 3D printer instructions to a 3D printer for printing the parts according to the determined placement.

Figure 2:
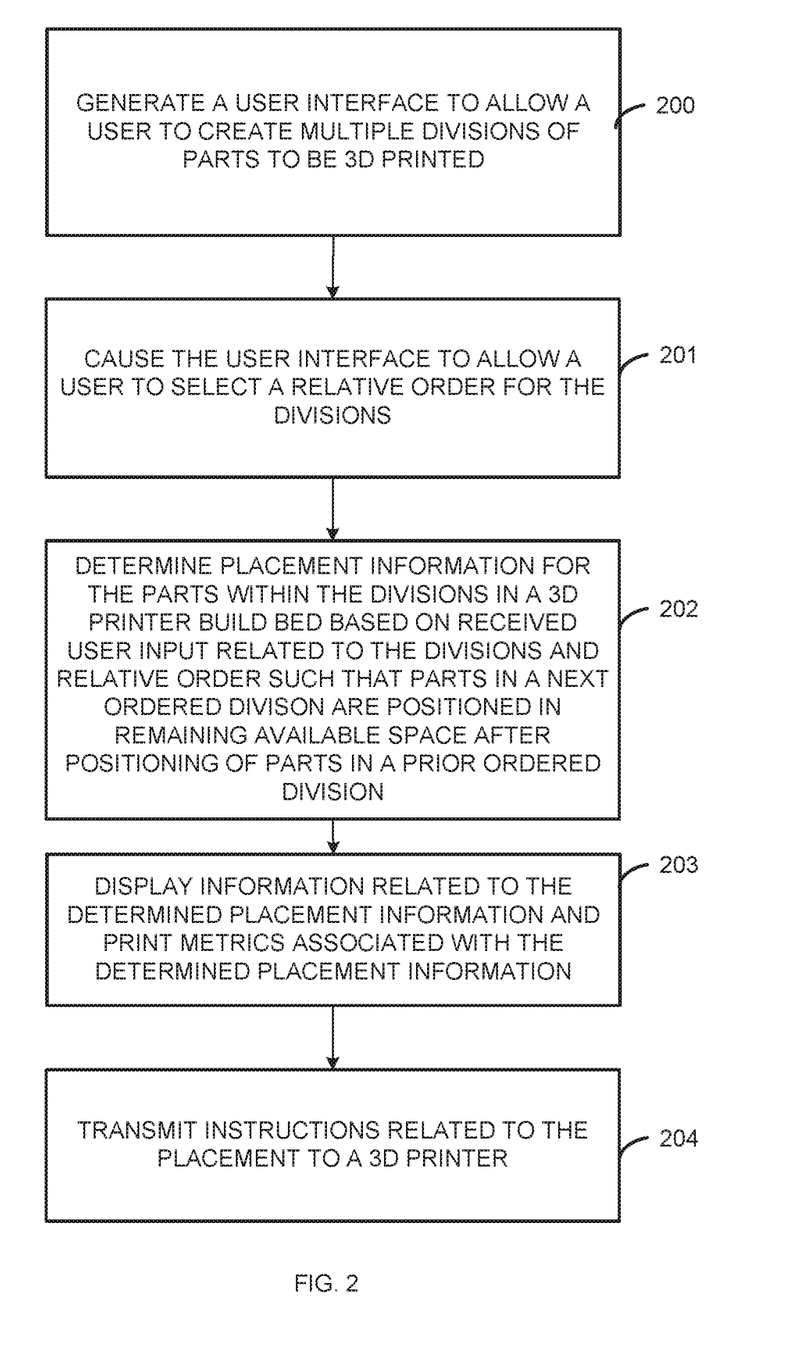
FIG. 2 is a flow chart illustrating one example of a method to determine 3D print part placement.

FIG. 2 is a flow chart illustrating one example of a method to determine 3D print part placement. For example, the part placement may be determined based on user input related to divisioning of 3D print parts and ordering information related to the divisions. The parts may be any suitable objects to be manufactured by a 3D printer. The part placement may be displayed to allow a user to view a recommended placement and to make changes to the parts and/or divisions. The method may be implemented, for example, by the computing system 100 of FIG. 1.

Beginning at 200, a processor generates a user interface to allow a user to create multiple divisions of parts to be 3D printed. For example, each division may be associated with a part type and number of parts to be 3D printed, and the user interface may allow the part type of multiple divisions to be non-exclusive. For example, multiple divisions may include the same part type in the same or different quantities. The parts may be any suitable object that may be 3D printed. In one implementation, the same part may be included in multiple divisions, but a division may be limited to a single part type.

The user interface may facilitate a user in divisioning of the parts. In one implementation, the user interface includes an indicator to display the size of a part relative to the print area to give the user information about the relative amount of space in the print area taken up by a part of a particular part type. In one implementation, the user interface displays information about the number of the part type that can be included in a single layer on the print area. For example, the processor may determine the number of a part type that can fit in a build layer based on the dimensions of the part and output the information to the user. A user may choose to create divisions based on the information in order to print the job in fewer layers.

Continuing to 201, a processor causes the user interface to allow a user to select a relative order for the divisions. For example, the user interface may allow a user to order the divisions to specify the order that the parts will be placed in the build area. In one implementation, the processor may suggest an order that a user may update. In one implementation, the order associated with a division is determined automatically based on the order in which it is added to the print job. For example, the order may be determined based on when parts are added by appending each new division to the end, and a user may select to update the order after each division is added to the print job.

Continuing to 202, a processor determines placement information for the parts within the divisions in a 3D printer build area based on received user input related to the divisions and relative order such that parts in a next ordered division are positioned in remaining available space after positioning of parts in a prior ordered division. In one implementation, the processor places parts starting in a leftmost lower corner and ending in a rightmost upper corner in a build layer. Parts may be placed in a lower layer prior to placing parts in an upper layer. In one implementation, the order for placement starts in the bottom left corner of the build area, then moves in the Y direction toward the back of the build area, then moves in the X direction toward the right of the build area, and then moves in the Z direction upwards to a subsequent layer.

As an example, the processor may position a first part from a first division in a bottom corner of a build area. The processor may determine positions relative to the first part where a subsequent part may be placed considering bounding box surfaces for the first part and a required inter-part spacing. For example, the processor may determine a set of points, such as three to five points, in relation to the first object where a second part may be placed. The processor may order the points based on their position so points with lower Z coordinate have precedence, among those with the same Z coordinate those points with lower X coordinate may have precedence, and for those with equal Z and X coordinates, those with lower Y coordinate may have precedence. The processor may attempt positioning the bottom left front corner of a second part at each of the points until a position where the second part fits is located. After the second part is placed the processor may remove points which are no longer viable and add additional points in relation to surfaces of the newly-added part. In one implementation, the processor may determine an optimal point of the set of potential points. The processor may then continue to add parts using the same procedure, finding the first available position for each new part from the ordered set of points, removing any points which are no longer possible after each newly-added part, and adding new points relative to each newly-added part. When all parts from a first division have been placed, the processor may continue with parts from the next highest-order division, continuing until all parts from all divisions have been placed. While this procedure may not be an optimal packing strategy it is fast, incremental, and deterministic, making it suitable for interactive user interfaces.

In one implementation, the processor positions the divisions in a second manner based on a different layout method. For example, the divisions may be positioned in the same order but with a different position determined due to a different method applied, such as a method optimizing a different print metric. The processor may determine the 3D print time associated with the second manner and output information about the determined 3D print time. The information may allow a user to select the preferred layout method based on the comparative 3D print metric.

In one implementation, the processor places parts hierarchically. The method may allow for a divisions to be contained in bins such that additional layers to the divisioning may be added. For example, a user may select divisions to associate with a bin, and the user interface may allow bins to be ordered relative to one another. In one implementation, the processor may generate a user interface to allow a user to repack a single bin by updating the divisioning or ordering or allow a user to repack a bin in a manner to replicate a change across a set of bins. In one implementation, the bins may be sent to different printers or printed by the same 3D printer at a different time. A hierarchical part placement method may allow any suitable number of hierarchical layers, such as where divisions are assigned to bins which are assigned to a higher level container.

Continuing to 203, a processor displays information related to the determined placement information and print metrics associated with the determined placement information. The information may be displayed in any suitable manner. For example, the information may be displayed with the print area and the relative position and size of the parts in the print area in the placed position. In one implementation, the print area includes a grid or other information to show the relative size of the print area.

The displayed print metrics may be any suitable print metrics, such as related to build material volume, print time, or other metrics associated with the printing process. In one implementation, the processor determines a 3D print time for the determined position information and outputs information related to the 3D print time. For example, the estimated print time may be displayed.

In one implementation, the displayed information may indicate if a part does not fit in the print area dimensions when placed with the selected divisioning and ordering selection. For example, the parts not fitting in the print area may be shown in a different color, shading, or other indication to show that they do not fit. The processor may determine additional packing options. The options may involve reordering the divisions such that the parts remain in the divisions selected by user input. In one implementation, the processor may recommend a different divisioning of the parts. The ordering method may include largest part or division first, tallest part or division first, or other method for automatically packing the parts. In one implementation, the processor uses the selected division order and attempts to pack the divisions according to a set of different methods. Print metrics related to the results may be displayed. In one implementation, the processor selects a packing method and attempts the packing method with different orders to the divisions and outputs information about the different division ordering for the method. The processor may sort information related to the different methods and display the output to the user to allow the user to select a divisioning and/or packing method.

In one implementation, a processor updates the position information based on user feedback. As an example, a user may manually change a portion of the placement or may update the divisions and/or division ordering information. In one implementation, a user may select to split a part type into two separate divisions in order to create different packing. For example, the processor may suggest a change to the divisions and provide an updated build time based on the new divisioning information.

Continuing to 204, a processor transmits instructions related to the placement to a 3D printer. For example, the processor may create instructions for the 3D printer in a 3MF file. The processor may create the instructions based on the printer and/or printer type, such as based on the type of 3D print technology used by a selected printer. A 3D printer may receive the instructions and print the multiple parts according to the transmitted instructions.

Figure 3:
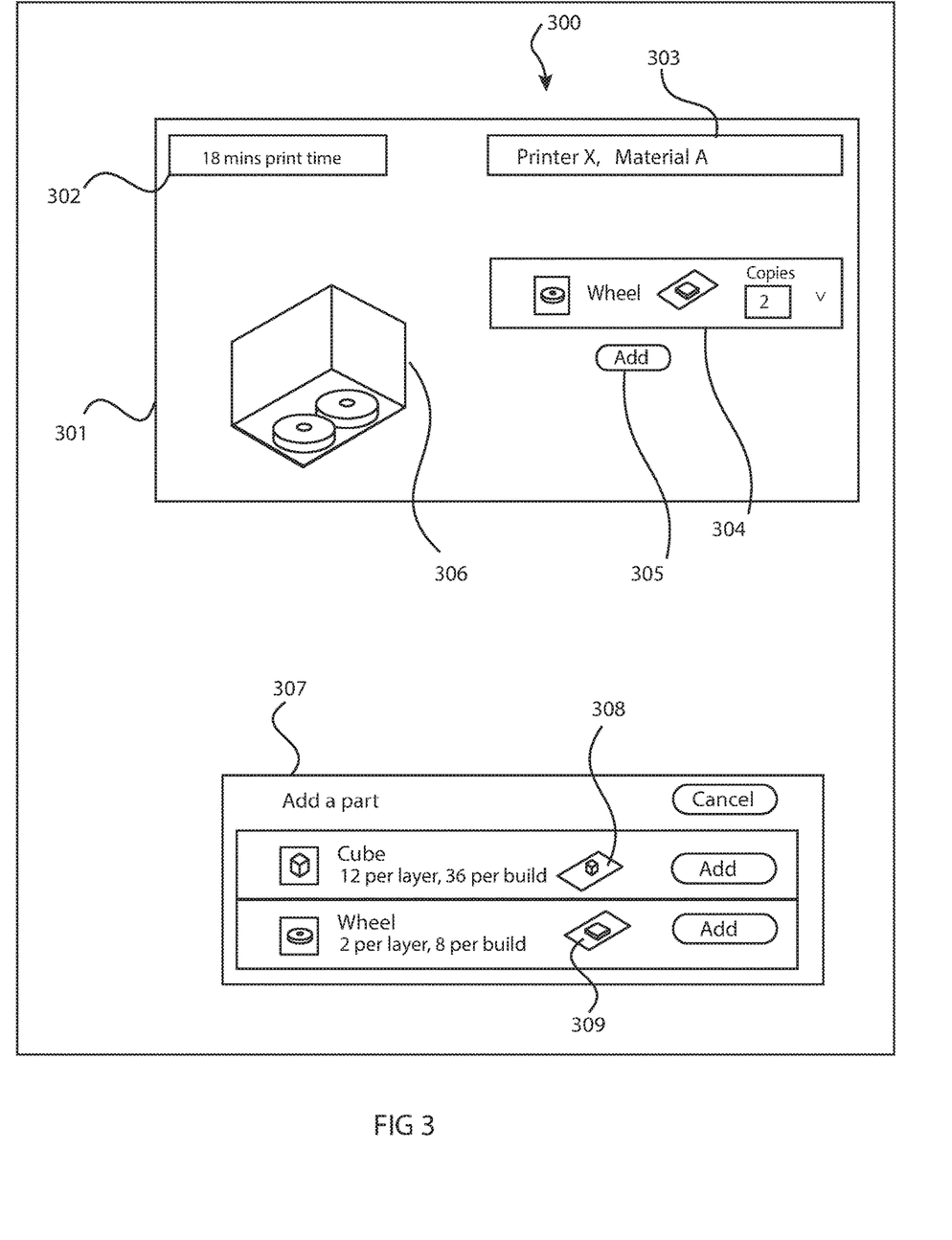
FIG. 3 is a diagram illustrating one example of a user interface for a computing system to determine 3D print part placement.

FIG. 3 is a diagram illustrating one example of a user interface 300 for a computing system to determine 3D print part placement in a build area for 3D printing. The user interface 300 may allow for any suitable type of user input, such as keyboard, mouse, touch, or voice input. A user interface may collect information about 3D print job divisions and priority order in any suitable manner, and FIG. 3 illustrates one example. The user interface 300 may include multiple displays or other user interfaces to allow a user to provide information about a 3D print job. For example, the user interface 300 may include print job display 301 and part addition display 307. The print job display 301 and part addition display 307 may be displayed simultaneously or separately.

The print job display 301 may show current selections for a 3D print job. For example, print job display 301 may include print process information 303, such as the printer and material settings. The print job display 301 includes print metric information 302, such as estimated print time, part selection information 304, and part placement information 306. The print job display 301 may include an input option, such as part addition input 305, to add additional parts to the print job.

The parts for the print job may be organized into divisions. The print job display 301 shows a print job for printer X to print a division of 2 wheels from material A. The print job display 301 includes print metric information 302 which shows the print time of 18 minutes. The print job display 301 may allow a user to update the printer, material, or divisions. For example, a user may select to print 3 wheels or to change the material type from plastic to metal. The print job display 301 shows print placement information 306 with an arrangement of the 2 wheels in the print job such that they are in the same layer in a front portion of a print build bed.

The user interface 300 may include part addition display 307 to allow a user to add additional parts, which may be added to a new or existing part division. For example, the part addition display 307 may be generated by a processor to allow a user to add a part to the print job. For example, a user may select a part type. Once the part is added, the user may select the number of copies of that part along with a priority order for the new division as compared to existing print part divisions shown in print job display 301. Part addition display 307 shows a user selecting a part for creating a new division for the print job information shown in print job display 301. For example, part addition display 307 shows a 40 mm cube and a wheel. Part addition display 307 includes icons 308 and 309 to provide a visual cue of the relative size of a selected part compared to a build area layer. For example, icon 308 shows the relative smaller size of a cube compared to the icon 309 which shows the relative larger size of a wheel compared to a build area layer of the selected printer type. The part addition display 307 may include the number of a part capable of fitting in a layer or filling a build with the part option. For example, the part addition display 307 shows that 12 cubes fit in a build layer with 36 in the entire build area or that 2 wheels fit in a build layer with 8 wheels fitting in the entire build area.

FIGS. 4A, 4B, 4C, and 4D are diagrams illustrating example of user interfaces for displaying 3D print part placement according to a selected 3D print part divisions and ordering. For example, a processor may determine part placement information based on divisions of parts and ordering between the divisions, and the processor may display information about the determined part placement to a user.

Figure 4A:
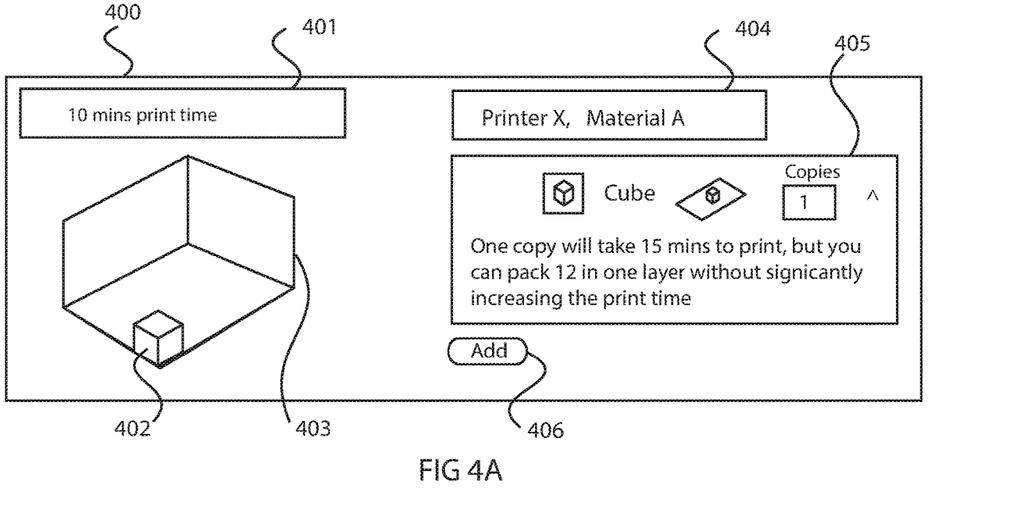
FIGS. 4A, 4B, 4C, and 4D are diagrams illustrating example of user interfaces for displaying 3D print part placement according to a selected 3D print part divisions and ordering.

FIG. 4A shows a user interface for displaying information related to user input provided related to a print job. For example, the user interface includes print job display 400 including print metric information 401, print process information 404, part selection information 405, part placement information 403, and part addition input 406. The part placement information 403 shows part placement in a print area. The part selection information 405 shows a print job with a single division of one cube. The part placement information 403 displays arrangements of parts within a print area in a layout in which the parts would be printed. The part placement information 403 shows a print area, such as a build bed, where cube 402 is placed. Additional information may be displayed about a division. For example, part selection information 405 includes the information that 12 copies of the cube part may be placed in one layer and printed in approximately the same time as a single part.

Figure 4B:
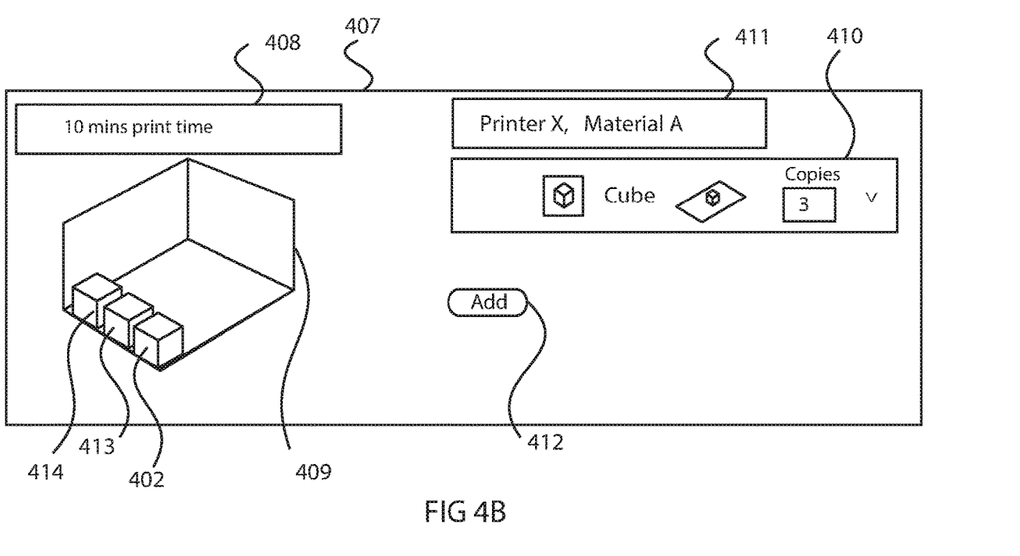

FIG. 4B shows the same user interface as FIG. 4A except the number of copies of the cube has been increased to 3, and these two additional cubes 413 and 414 are automatically positioned in a print area following cube 402. For example, FIG. 4B includes print job display 407 with print metric information 408, print process information 411, part selection information 410, part placement information 409, and part addition input 412. The part placement information 409 shows the three cubes 402, 413, and 414 placed in print build area. The print time of 10 minutes may be the same as the print job in FIG. 4A because the three cubes may be printed simultaneously in the same layer.

Figure 4C:
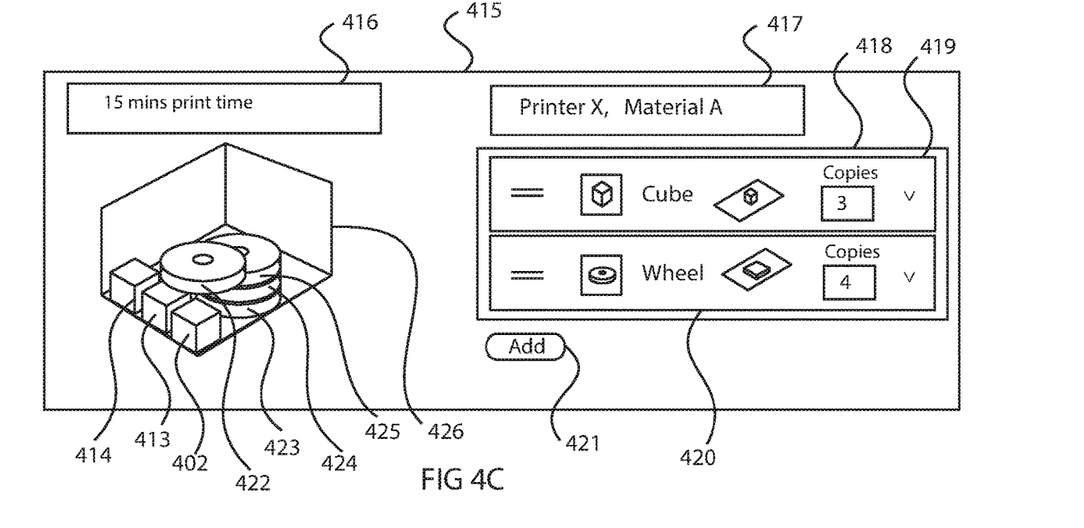

FIG. 4C shows the same user interface as FIG. 4B, but with an additional division containing 4 wheels. For example, FIG. 4C includes print job display 415 with print metric information 416, print process information 417, part selection information 418, part placement information 426, and part addition input 421. The part selection information 418 shows a first division 419 including 3 cubes and a second division 420 including 4 wheels. The ordering of divisions determines the order of part placement in the build. For example, division 419 is before division 420, and the three cubes 402, 413 and 414 from division 419 are positioned in the build before the 4 wheels 422, 423, 424, and 425. The part placement information 426 displays the determined build placement information to a user. The position of each part within the build depends on preceding parts and does not change as later parts are added. While not always the most efficient packing strategy, this method is predictable and consistent and thus likely easy for users to understand. If a user creates a new build with the same divisions, then the part placement will be identical.

Figure 4D:
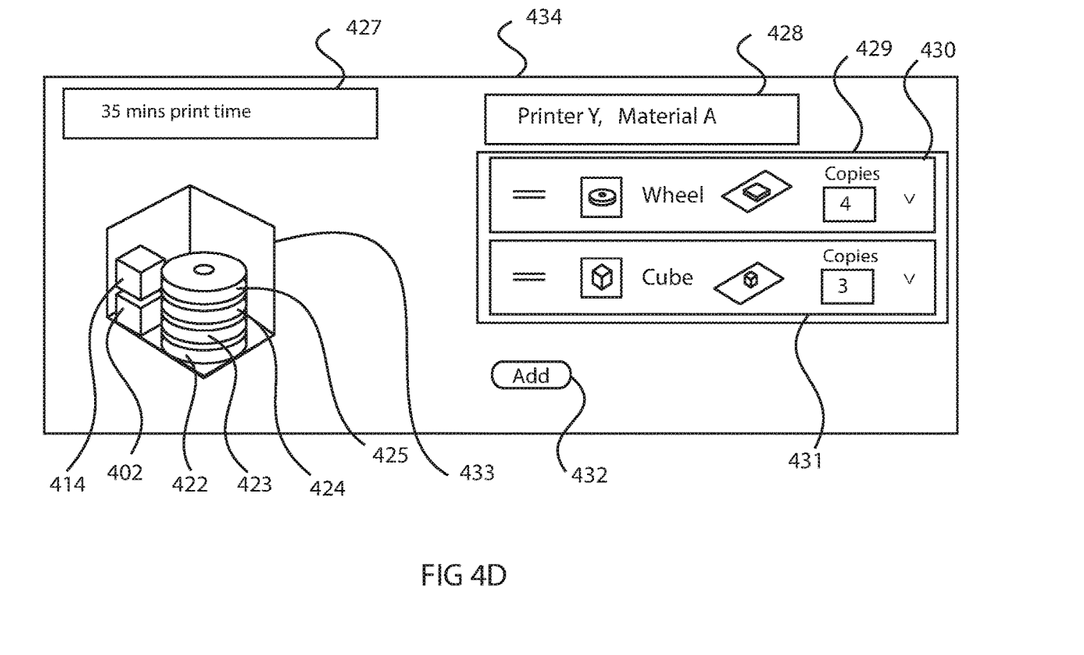

FIG. 4D shows a print job with the same print job as in FIG. 4C, but with a different size print area. For example, FIG. 4D includes print job display 434 with print metric information 427, print process information 428, part selection information 429, part placement information 433, and part addition input 432. The print process information 428 shows the selected printer to be printer Y, but the remaining print job information is the same as shown in the print job of FIG. 4C.

The part placement information 433 shows the 4 wheels 422, 423, 424 and 425 stacked with the cubes 402, and 414 (cube 413 is also placed, but not visible in the figure since it is hidden behind the wheels). The processor may select the different layout due to the different area size of the print area of printer Y. The ordering of the divisions remains unchanged with division 430 of wheels prior to division 431 of cubes and, thus, the wheels are still placed in the bed before the cubes. If the printer was changed back to printer X, the packing would revert to that shown in FIG. 4C because the ordering of the divisions would not have changed. In this way, the packing behavior is visible and consistent, aiding the user by providing predictability. The wheels 422, 423, 424, and 425 are stacked due to the more narrow dimensions of printer Y. Similarly, a different layout may be selected if a different material with different part spacing between the parts or other print job settings are selected.

FIGS. 5A, 5B, 5C, 5D, 5E, and 5F are diagrams illustrating examples of updating 3D print part placement of parts in a print area based on divisions and ordering. For example, the same types and numbers of parts may be positioned differently based on the parts being divisioned differently and/or divisions prioritized in a different order.

Figure 5A:
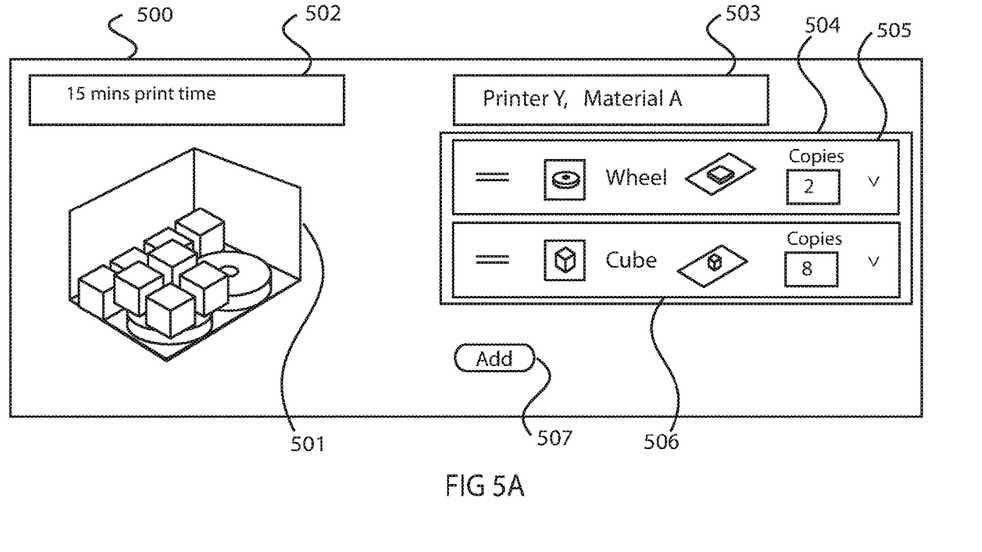
FIGS. 5A, 5B, 5C, 5D, 5E, and 5F are diagrams illustrating examples of updating 3D print part placement of parts in a print area based on divisions and ordering.

FIG. 5A shows print job display 500 with print metric information 502, print process information 503, part selection information 504, part placement information 501, and part addition input 507. Individual items from print job display 500 may be displayed separately or simultaneously on a display device. Part selection information 504 shows information about a 3D print job including 8 cubes and 2 wheels such that the division 505 of cubes are prioritized below the division 506 of wheels. A processor may determine an arrangement in a build area based on a user provided divisioning and ordering such that the wheels are placed in an efficient position and the cubes are then placed in an efficient position in the remaining space in the build area.

The part placement information 501 shows the parts from the part selection information 504 in the determined arrangement. For example, the part placement information 501 may display the parts in the determined arrangement to allow a user to view the arrangement in a manner that is easily analyzed by the user.

The part placement information 501 shows a build area for a 3D printer. The part placement information 501 shows a first layer with 2 wheels and 4 cubes such that the cubes are arranged in a line. The part placement information 501 includes a second layer with the 4 remaining cubes in a 2×2 configuration. The print time is shown in print metric information 502 to be 15 minutes.

Figure 5B:
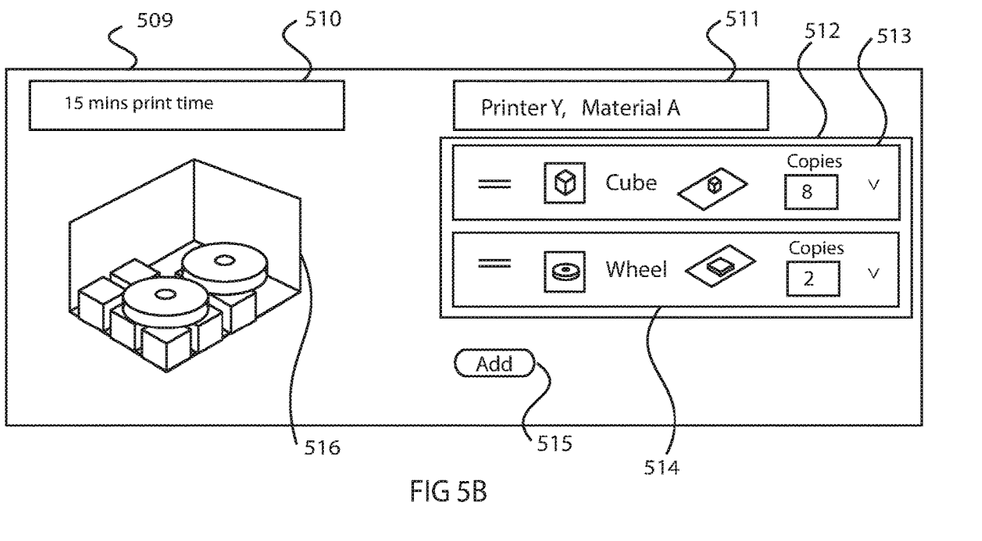

FIG. 5B shows the same print job as FIG. 5A except the ordering of the divisions has changed. For example, a user may change the ordering by dragging division 506 to a position preceeding division 505 in FIG. 5A. FIG. 5B shows print job display 509 with print metric information 510, print process information 511, part selection information 512, part placement information 516, and part addition input 515. The part selection information 512 includes division 516 of 8 cubes prioritized prior to division 514 of 2 wheels, opposite of the prioritization shown in FIG. 5A. Since division 513 containing cubes now precedes division 514 containing wheels, the cubes are positioned first in the build area. Because there is insufficient space for a wheel in the same layer with the cubes, both wheels are placed above the cubes as shown in part placement information 516.

Figure 5C:
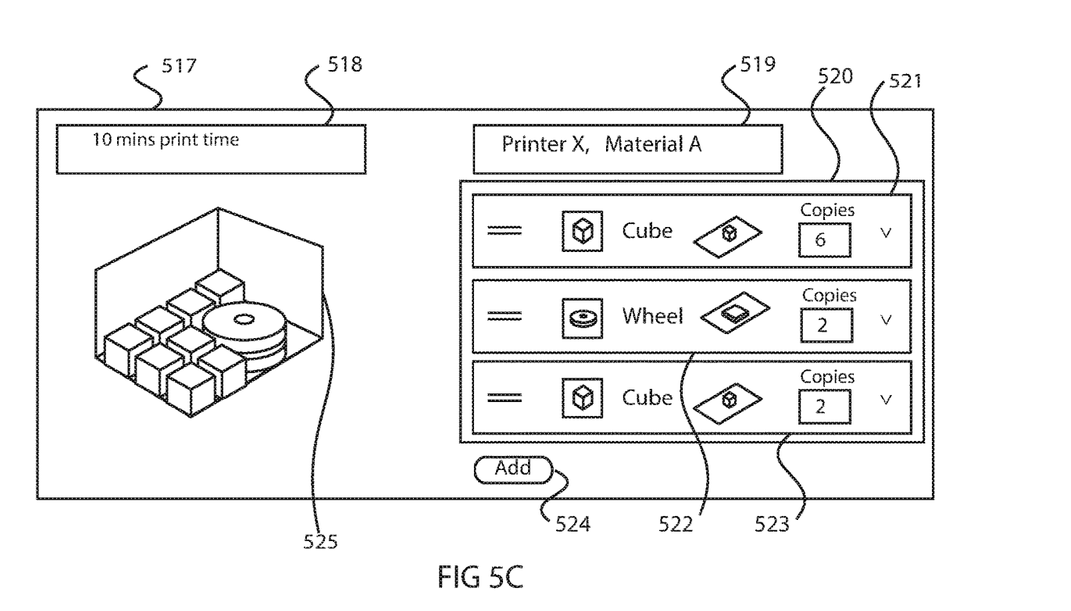

FIG. 5C shows print job display 517 with print metric information 518, print process information 519, part selection information 520, part placement information 525, and part addition input 524. The print job display 517 shows a print job with the same number and types of parts as in FIG. 5B, but with different divisioning. For example, the cubes are divided into two divisions and separated in the priority order to allow for the parts to be placed in fewer layers. The print job display 517 shows a first division 521 of 6 cubes and a second division 523 of 2 cubes with a division 522 of 2 wheels prioritized between the two divisions of cubes. In one implementation, a user may make a change in response to displayed information about the number of a part type that fit in a layer.

The part placement information 525 shows a build area, such as a powder bed, that depicts the parts in a determined configuration. For example, a processor may determine a layout for the parts based on the divisions and prioritization, and the part placement information 525 may show the parts in the determined configuration. The part placement information 525 may show the parts relative to the size of a build area. In one implementation, the part placement information 525 includes grid lines or other information to indicate the relative size of a print area to the parts displayed in the print area.

The part placement information 525 shows a first layer with 8 cubes. The space remaining area in the layer allows for 2 of the wheels to be included in the layer along with the 8 cubes. The configuration in the part placement information 525 includes fewer layers than in FIG. 5B, resulting in a faster build time. For example, the print metric information 518 shows the print time as 10 minutes.

Figure 5D:
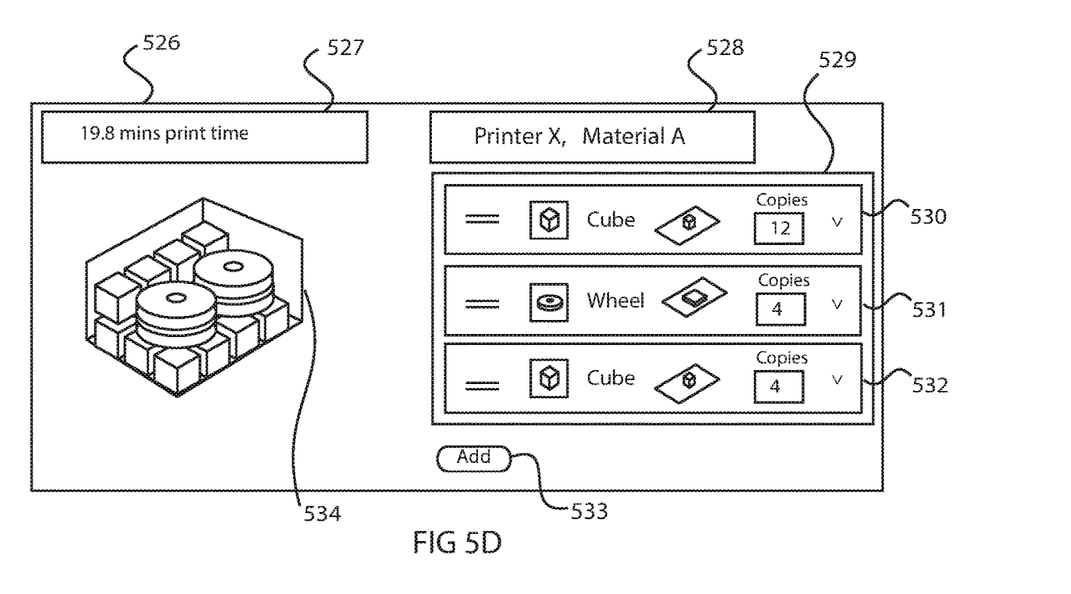

FIG. 5D shows the same print job as FIG. 5C except the user has increased the number of parts in the individual divisions from 8 to 16 cubes and from 2 to 4 wheels. FIG. 5D shows print job display 526 with print metric information 527, print process information 528, part selection information 529, part placement information 534, and part addition input 533. The part selection information 529 includes divisions 530-532. For example, based on displayed information that 12 cubes will fill one layer, a user may choose a first division with 12 cubes followed by a second division of 4 wheels and then a third division of 4 cubes to fill the remaining space.

Figure 5E:
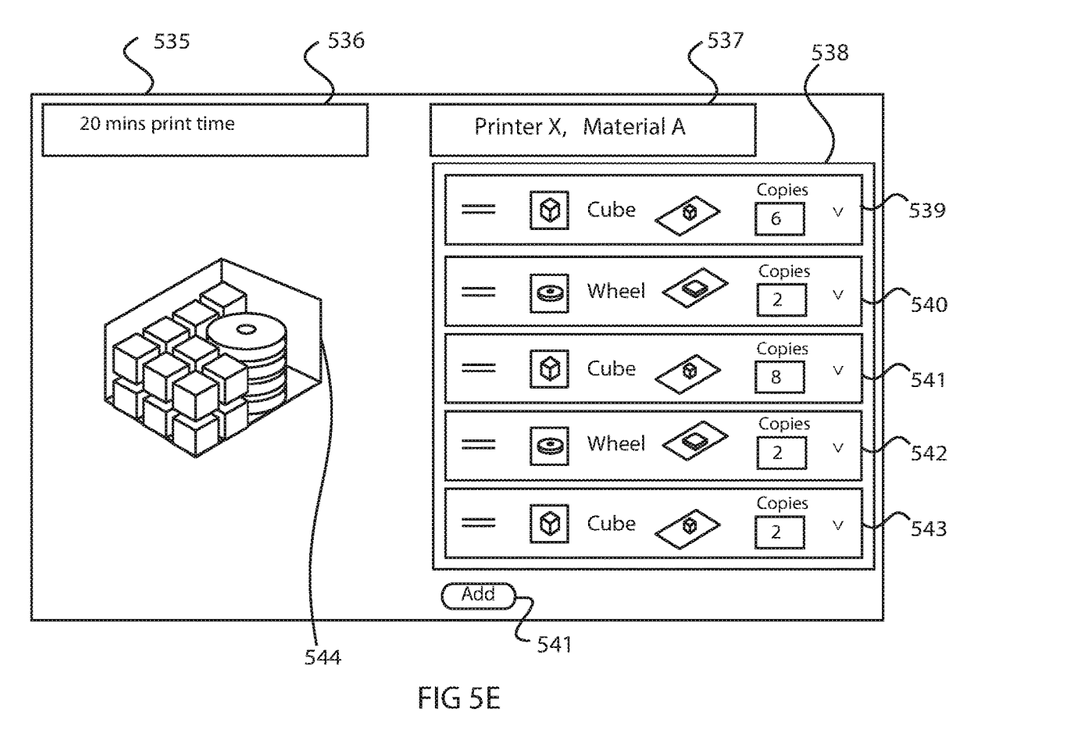

FIG. 5E shows the same print job as FIG. 5D with the same total number and type of parts but with different divisions. FIG. 5E shows print job display 535 with print metric information 536, print process information 537, part selection information 538, part placement information 544, and part addition input 541. The part selection information 538 shows divisions 539-543. By having more divisions in this ordering, the user is able to achieve a packing similar to two layers of the packing in FIG. 5D with an additional layer due to the increased number of parts. For example, part placement information 544 shows the determined layout information.

Figure 5F:
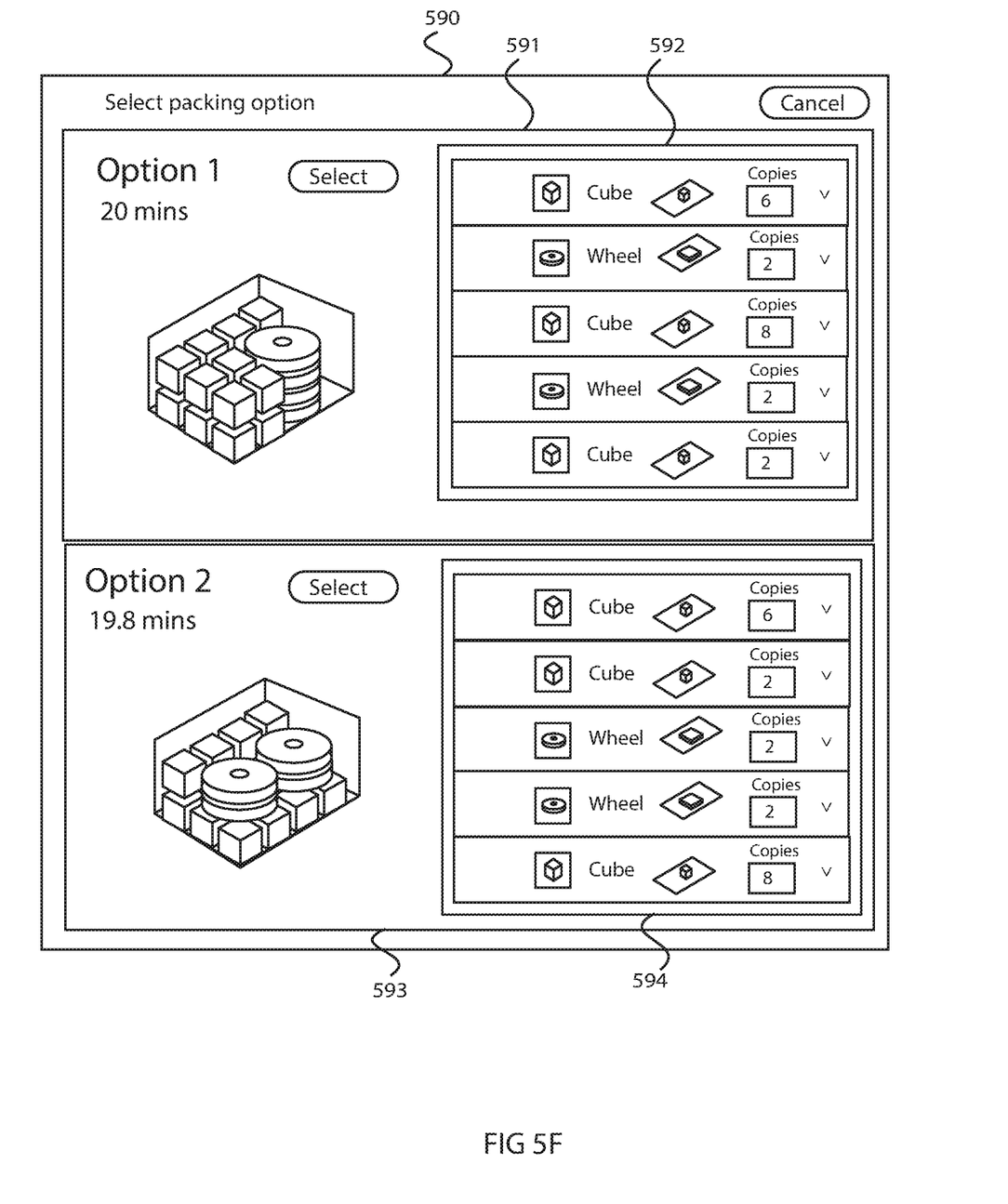

FIG. 5F shows an additional user interface component 590 through which a processor can recommend alternative packings to a user. In this case the original packing, shown in the first option 591, is the same as in FIG. 5E. By testing different relative orderings for the divisions, the system determines an alternative packing option 593 with a very slightly faster print time. The part and count within each division remains the same, and the ordering of the divisions has changed between the original division ordering 592, and new division ordering 594. By limiting the changes to the division ordering, the changes are easy to explain to the user, and the change is readily apparent and predictable.

Figure 6:
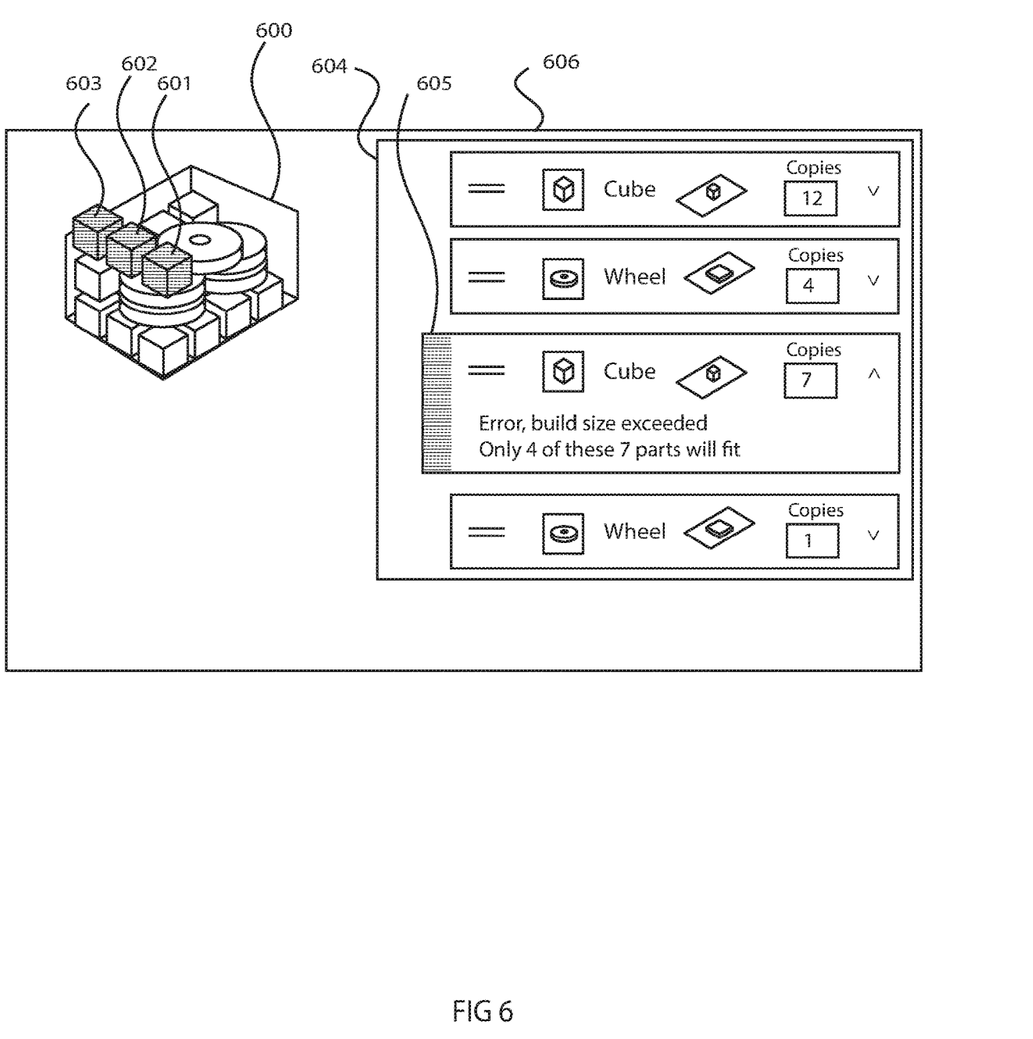
FIG. 6 is a diagram illustrating one example of a user interface to display 3D print parts in a build area.

FIG. 6 is a diagram illustrating one example of a user interface to display 3D print parts in a build area. FIG. 6 shows a user interface including a print job display 606 to display parts fitting in a build area. For example, the print job display 606 includes part placement information 600 showing parts in a build area. Part selection information 604 shows selected part types and numbers for 4 divisions. The parts 601, 602 and 603 are shown in part placement information 600 in a different manner to indicate that they are part of a requested print job, but do not fit into the build area. For example, the parts 601, 602, and 603 may be shown with different color, shading, or other characteristics to indicate that they do not fit into the build area. In addition, division 605 which contains parts 601-603 is similarly highlighted with an error message displayed. In response, a user may select to move the additional parts to a new print job or may attempt to re-arrange the parts to fit within the build area. In one implementation, a processor may determine an alternative placement that fits the parts within the build area and display information about the alternative placement, similar to as shown in FIG. 5F. A part placement method that combines user control of divisioning and prioritization with automatic layout methods may result in a more intuitive process for users.

The invention claimed is:

1. A computing system, comprising:
 a processor to:
  generate a user interface to receive user input related to multiple divisions of 3D print parts and a relative order between the multiple divisions,
   wherein the user interface allows user input for each division related to a part type and number of parts for the division, and
   wherein the user interface allows a same part type to be selected for the multiple divisions;
  determine part placement information for parts in the multiple divisions in a 3D print build area based on the user input to the user interface, wherein the 3D print build area comprises a plurality of different vertical layers for the multiple divisions;
  display information related to the part placement information that is determined and a print metric associated with the part placement information that is determined; and
  translate the part placement information that is determined into 3D printer instructions.

2. The computing system of claim 1, wherein the computing system further comprises:
a storage to store 3D print process information, and wherein the processor to determine the part placement information comprises the processor to determine the part placement information based on the 3D print process information.

3. The computing system of claim 1, wherein the processor is further to determine part placement information for an additional division of parts without changing the part placement information that is determined of previously placed divisions of the 3D print parts.

4. A method, comprising:
generating a user interface to allow a user to create multiple divisions of parts to be 3D printed,
wherein each division is associated with a part type and number of parts to be 3D printed and
wherein the user interface allows the part type of multiple divisions to be non-exclusive;
causing the user interface to allow a user to select a relative order for the multiple divisions;
determining, by a processor, placement information for parts within the multiple divisions in a 3D printer build area based on received user input related to the multiple divisions and the relative order such that parts in a next ordered division are positioned in remaining available space after positioning of parts in a prior ordered division, wherein the 3D printer build area comprises a plurality of different vertical layers for the multiple divisions;
displaying information related to the placement information that is determined and print metrics associated with the placement information that is determined; and
transmitting instructions related to the placement information that is determined to a 3D printer.

5. The method of claim 4, wherein displaying information comprises displaying a part differently to indicate that the part does not fit in the 3D printer build area.

6. The method of claim 4, further comprising:
determining the number of the part type that can fit in a build layer; and
outputting the number of the part type that can fit in the build layer that is determined.

7. The method of claim 4, further comprising displaying a visual indicator of a size of the part relative to the 3D printer build area.

8. The method of claim 4, further comprising:
positioning the multiple divisions in a second manner based on a different placement method;
determining a 3D print time associated with the second manner; and
outputting information about the 3D print time that is determined.

9. The method of claim 4, further comprising 3D printing the multiple divisions of parts according to the instructions that are transmitted.

10. The method of claim 4, further comprising splitting a division into two divisions of the same part type.

11. The method of claim 4, further comprising updating the placement information based on user feedback.

12. A computer readable non-transitory storage medium comprising instructions executed by a processor to:
access information related to a first set of 3D print parts to be printed and a relative order of the first set compared to a second set of 3D print parts to be printed;
determine position information in a 3D printer build area for the first set of 3D print parts and the second set of 3D print parts, wherein the 3D printer build area comprises a plurality of different vertical layers for multiple divisions of the first set of 3D print parts and the second set of 3D print parts,
wherein the first set of 3D print parts is positioned in a manner based on a print metric, and
wherein the second set of 3D print parts is positioned in remaining space after the first set of 3D print parts is positioned based on the print metric; and
translate the position information into 3D printer instructions.

13. The machine-readable storage medium of claim 12, further comprising instructions to:
determine a 3D print time for the first set of 3D print parts and the second set of 3D print parts based on the position information that is determined; and
output information related to the 3D print time.

14. The machine-readable storage medium of claim 12, further comprising instructions to display information about the position information that is determined relative to dimensions of a print area.

15. The machine-readable storage medium of claim 12, further comprising instructions to split the first set of 3D print parts into two sets of the same part type.

\* \* \* \* \*